Patented Nov. 30, 1943

2,335,238

UNITED STATES PATENT OFFICE 2,335,238

PRODUCTION OF ALIPHATIC ALDEHYDES

Henry Dreyfus, London, England, assignor to Celanese Corporation of America, a corporation of Delaware No Drawing. Application February 12, 1941, Serial No. 378,654. In Great Britain February 23, 1940

10 Claims. (Cl. 260—603)

This invention relates to the production of oxygen-containing compounds.

According to the invention aliphatic aldehydes, ketones and other useful compounds are produced by subjecting olefine oxides or glycols in vapour form to the action of heat in the presence of a limited quantity of water.

An important embodiment of the invention is the production of acetaldehyde from ethylene oxide or from ethylene glycol, but the invention includes also the production of higher aliphatic aldehydes and other products, especially ketones, for instance the production from propylene oxide or propylene glycol of propionaldehyde and acetone, and the production of similar products from butylene oxide and butylene glycols.

The process is one which does not need the presence of water in so far as the chemical equations representing the changes which take place are concerned and, indeed, when glycol is the starting material the reaction is one of dehydration. Nevertheless, a small quantity of water has been found to have an important effect in suppressing undesired reactions and in causing the process to give high yields of the desired products. In general, it is sufficient to employ a quantity of from somewhat less than 1 molecule, for instance ⅓ of 1 molecule, to 2 or 3 molecules, for each molecule of olefine oxide or glycol, and even smaller quantities have a beneficial effect on the process. Larger quantities of water than those indicated may, of course, be used in the process although the use of such quantities as would result in excessive dilution of the products is undesirable.

There are a number of substances which can be used as catalysts in the process of the invention, very good results being given by acid salts including sulphates, borates, tungstates, and especially phosphates of magnesium and of the alkaline earths. Similar salts of heavy metals particularly of copper, aluminium and cerium may also be employed; heavy metal compounds are often used to best effect in admixture or in chemical combination with the magnesium or alkaline earth salts referred to, for instance a catalyst containing copper oxide or phosphate together with magnesium pyrophosphate has been found to be very effective. On the other hand magnesium pyro-phosphate and aluminium ortho-phosphate are examples of salts which show high catalytic activity in the process when used on their own. In some cases the acids themselves or oxides from which the acids may be derived may be employed as such, notably in the case of phosphoric acid and tungstic oxide, either alone or in conjunction with the salts referred to; for instance the addition of a little free phosphoric acid to aluminium ortho-phosphate results in the production of a catalyst which is of greater mechanical stability than is aluminium ortho-phosphate alone. The alkaline earth metals also have a favourable influence on the process when they are present in the form of halides or oxy-halides, more particularly when the starting material is an olefine oxide.

Alumina and metal oxides of a more basic nature, e. g. zinc oxide or even oxides of the alkali and alkaline earth metals, and bisulphates, especially of the alkali metals, can also be used, more particularly when the starting material is a glycol. In this case a small quantity of a halohydrin or of a halogen acid may be introduced into the reaction zone, e. g. when ethylene glycol is decomposed to produce acetaldehyde there may be present a small quantity of ethylene glycol chlorhydrin. The quantity of halohydrin used in this way may be equal to 1 to 5% of the weight of the glycol used, and the presence of even smaller quantities, e. g. down to 0.1 to 0.4%, has a beneficial effect on the yield of aldehyde.

The process may be carried out by passing the olefine oxide or glycol vapour through a heated reaction zone containing the catalyst which may be employed as such, e. g. moulded into the form of pellets, or may be mixed with or supported on carriers such as kieselguhr, pumice or silica gel. The catalyst may also be used upon a metallic carrier of high thermal conductivity consisting, for instance, of a gauze or mass of crumpled wire made from copper or other suitable metal, and the use of such a carrier is especially advantageous from the point of view of effecting uniform heating of the starting material to the thermal decomposition temperature.

The catalysts can often be employed with advantage as a dispersion in the gaseous phase within the reaction zone, this method of using the catalyst being especially suitable in the case of phosphoric acid, phosphates and other compounds having a small degree of volatility. When it is desired to use the catalyst in this manner it may be dissolved or suspended in a suitable liquid, e. g. water or the glycol used as or corresponding to the starting material, and the solution or suspension injected into the vaporous starting material as or just before it enters the zone in which the thermal decomposition is effected. Quite small amounts of catalyst are sufficient when used in this way, for instance quantities equal to ¼ to 1% or even less e. g. down to 0.2 to 0.1% of the weight of the olefine oxide or glycol. If desired, instead of the catalyst itself, there may be introduced in this way a substance giving rise to the catalyst under the reaction conditions.

The catalyst may also be employed in the liquid phase, for instance by using it as an ingredient in a melt through which the starting material is bubbled in a rapid stream and which is maintained at the thermal decomposition temperature.

When the catalyst is employed in the liquid phase part or all of the water which it is desired to use in the process may be mixed with the catalyst. Thus, the process may be carried out by passing a vaporous olefine oxide or glycol into contact with a heated liquid medium comprising a catalyst and containing water, additional water in vapour form being added to the vaporous olefine oxide or glycol if desired. When carrying out the process in this way very satisfactory results have been obtained by using zinc chloride as the catalyst, and it has been found with this particular salt that it is only necessary to have present sufficient water to maintain the salt in liquid form at the reaction temperature which need be no more than a few degrees above the boiling point of the glycol employed, say a temperature of between 200 and 225° C. in the case of ethylene glycol. Similar temperatures can be used when an olefine oxide is the starting material. Under such conditions ethylene glycol is transformed almost entirely into acetaldehyde. Small quantities of condensable products, especially ethylene methylene ether and dioxane, are sometimes formed, and these can be condensed from the products issuing from the zinc chloride bath and returned to the process, for instance by using a reflux condenser, and when so returned are decomposed to produce acetaldehyde.

In addition to the use of zinc chloride in the manner described above, other inorganic salts or compounds may be used as the basis of the catalyst and heating melt, especially salts or compounds having a strong dehydrating action whether this dehydrating action is exerted physically or chemically or catalytically. Such substances are, for example, phosphoric acid and phosphates, especially acid phosphates, acid sulphates such as the alkali metal bisulphates, and acid reacting sulphates such as those of zinc and copper, and hygroscopic chlorides such as calcium chloride. In all cases these catalysts can be used as ingredients in a fluid composition containing water, e. g., a strong aqueous solution.

The temperature at which the process is carried out may be varied according to the starting material, catalyst and method employed in carrying out the process. Thus, it has already been indicated that with zinc chloride it is only necessary to use a temperature a few degrees above the boiling point of ethylene glycol, and in general it may be stated that temperatures of between 200 and 500° C. or somewhat higher, e. g., up to 600° C., may be used, the higher temperatures, say from 400 to 600° C. being especially satisfactory when the starting material is a glycol. The starting material may be preheated to the thermal decomposition temperature, or to within 50–80° C. of this temperature, before being brought into contact with the catalyst. It is preferred to carry out the thermal decomposition at a pressure not substantially in excess of atmospheric pressure and, if desired, reduced pressure may be used. Thus the pressure in the reaction zone may be maintained at one-fifth to one-third of an atmosphere or even lower, e. g., down to one-tenth or one-twentieth of an atmosphere.

As previously indicated, the products produced should be cooled as soon as they leave the reaction zone in which they should not be permitted to stay for any considerable period. In practice this result can best be achieved by employing a very rapid stream of the starting material and by arranging for efficient cooling of the reactants as they leave the thermal decomposition zone. Unless such precautions are taken the aldehyde produced is liable to be subject to decomposition or polymerisation or other undesired reactions. The danger of such reactions can also be considerably reduced by the use of diluents in admixture with the vapour of the starting material. Such diluents may, for instance, be nitrogen, carbon dioxide or hydrogen and may be present in quite large proportions equal, for instance, to 4 or 5 or even more, e. g., 10 times, the volume of the vapour of the starting material.

The following examples illustrate the process of the invention as applied to the production of acetaldehyde from ethylene glycol:

Example 1

Ethylene glycol is fed into a flash vaporiser, and the glycol vapour produced is swept out by a current of nitrogen which is caused to carry the glycol vapour into and through a bath of aqueous zinc chloride heated to a temperature of 210–220° C. and containing sufficient water to remain fluid and of substantially constant composition at this temperature.

The vapours issuing from the surface of the zinc chloride are passed through a reflux condenser which is cooled to room temperature, whereby condensable products are returned to the reaction zone while acetaldehyde produced passes off in the nitrogen stream and can be condensed or collected by solution, for instance in acetic acid.

Example 2

Aqueous ethylene glycol of about 75% concentration is fed into a flash vaporiser, the vapours of glycol and water produced being passed in a rapid stream through a reaction tube containing an aluminium ortho-phosphate catalyst and maintained at a temperature of 350–400° C.

The vapours issuing from the tube are cooled to condense acetaldehyde produced together with small quantities of other products, the uncondensed vapours mixed with a little uncondensable gases being scrubbed with acetic acid to separate any acetaldehyde contained therein.

Having described my invention, what I desire to secure by Letters Patent is:

1. Process for the production of an aliphatic aldehyde, which comprises subjecting a glycol to the action of heat while in vapor form and in presence of an acid reacting salt and a quantity of water equal to at least ⅓ of a molecule per molecule of the glycol.

2. Process for the production of an aliphatic aldehyde, which comprises subjecting a glycol to the action of heat while in vapor form and in presence of an acid reacting salt and a quantity of water equal to between ⅓ of a molecule and 3 molecules per molecule of the glycol.

3. Process for the production of an aliphatic aldehyde, which comprises subjecting a glycol to the action of heat while in vapor form and in presence of an acid reacting salt maintained at a temperature of between 200 and 500° C. and a quantity of water equal to between ⅓ of a molecule and 3 molecules per molecule of the glycol.

4. Process for the production of an aliphatic aldehyde, which comprises passing a vaporous olefine glycol into zinc chloride containing sufficient water to maintain it in a fluid state and heated to a temperature of about 210 to about 220° C., and separating aldehyde from the vapors issuing from the zinc chloride.

5. Process for the production of an aliphatic aldehyde, which comprises passing a vaporous glycol and a quantity of water vapor equal to between ⅓ to 3 molecules per molecule of glycol in contact with an aluminum ortho-phosphate catalyst maintained at a temperature of about 350 to about 400° C.

6. Process for the production of acetaldehyde, which comprises subjecting ethylene glycol to the action of heat while in vapor form and in presence of an acid reacting salt and a quantity of water equal to at least ⅓ of a molecule per molecule of the glycol.

7. Process for the production of acetaldehyde, which comprises subjecting ethylene glycol to the action of heat while in vapor form and in presence of an acid reacting salt and a quantity of water equal to between ⅓ of a molecule and 3 molecules per molecule of the glycol.

8. Process for the production of acetaldehyde, which comprises subjecting ethylene glycol to the action of heat while in vapor form and in presence of an acid reacting salt maintained at a temperature of between 200 and 500° C. and a quantity of water equal to between ⅓ of a molecule and 3 molecules per molecule of the glycol.

9. Process for the production of acetaldehyde, which comprises passing vaporous ethylene glycol into zinc chloride containing sufficient water to maintain it in a fluid state and heated to a temperature of about 210 to about 220° C., and separating aldehyde from the vapors issuing from the zinc chloride.

10. Process for the production of acetaldehyde, which comprises passing vaporous ethylene glycol and a quantity of water vapor equal to between ⅓ to 3 molecules per molecule of glycol in contact with an aluminum orthophosphate catalyst maintained at a temperature of about 350 to about 400° C.

HENRY DREYFUS.